United States Patent [19]
Barat et al.

[11] Patent Number: 5,646,410
[45] Date of Patent: Jul. 8, 1997

[54] SYSTEM AND METHOD FOR VALIDATING THE DETECTION SIGNAL OF A MEASURING CHAIN WITH A WIDE BAND OF NUCLEAR RADIATIONS

[75] Inventors: Eric Barat, Paris; Alain Bourgerette, Mendes; Jean-Christophe Trama, Paris, all of France

[73] Assignee: Commissariat a l'Energie Atomique, Paris, France

[21] Appl. No.: 634,356

[22] Filed: Apr. 18, 1996

[30] Foreign Application Priority Data

May 11, 1995 [FR] France .................. 95 05581

[51] Int. Cl.$^6$ .................................................. G01T 1/17
[52] U.S. Cl. ........................................ 250/395; 250/252.1
[58] Field of Search ........................... 250/395, 252.1 R

[56] References Cited

U.S. PATENT DOCUMENTS

| | | | |
|---|---|---|---|
| 3,431,413 | 3/1969 | Anderson et al. | 250/395 |
| 5,371,362 | 12/1994 | Mestais et al. | 250/252.1 R |

FOREIGN PATENT DOCUMENTS

| | | |
|---|---|---|
| 0 263 386 | 4/1988 | European Pat. Off. . |
| 1.405.430 | 11/1965 | France . |
| 63-6485 | 1/1988 | Japan ............... 250/252.1 R |
| 1050306 | 12/1966 | United Kingdom . |

OTHER PUBLICATIONS

Kay, et al., "Spectrum Analysis—A Modern Perspective," *Proceedings of the IEEE*—vol. 69(11), pp. 1380–1410 (1981).

Basseville, "Distance Measures For Signal Processing And Pattern," *Signal Processing*—vol. 18, pp. 349–369 (1989).

*Primary Examiner*—Constantine Hannaher
*Attorney, Agent, or Firm*—Burns, Doane, Swecker & Mathis LLP

[57] ABSTRACT

System and method for validating the signal for detecting a measuring chain with a wide band of nuclear radiations.

This system for validating the signal of a measuring chain of nuclear radiations (1), includes a detector (10) able to deliver a wide spectral band signal to at least one processing unit (12, 14) and is characterized in that the system (30) includes means (32) for copying the detection system so as to deliver a copy of this signal to a calculation unit (34), the calculation unit (34) being able to calculate measuring spectral information representative of the spectrum of the detection signal and compare this information with reference spectral information. The system and method are applicable to chains for counting in fluctuations or pluses.

7 Claims, 2 Drawing Sheets

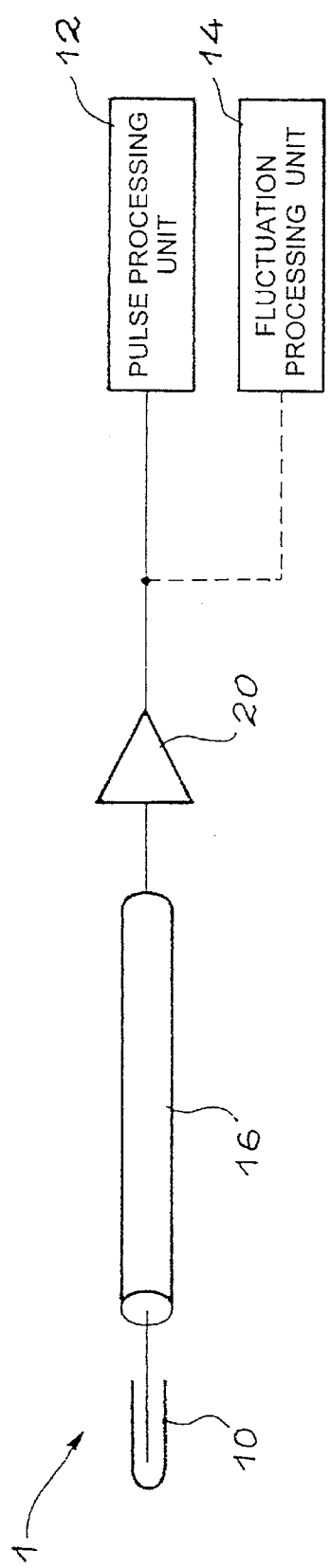
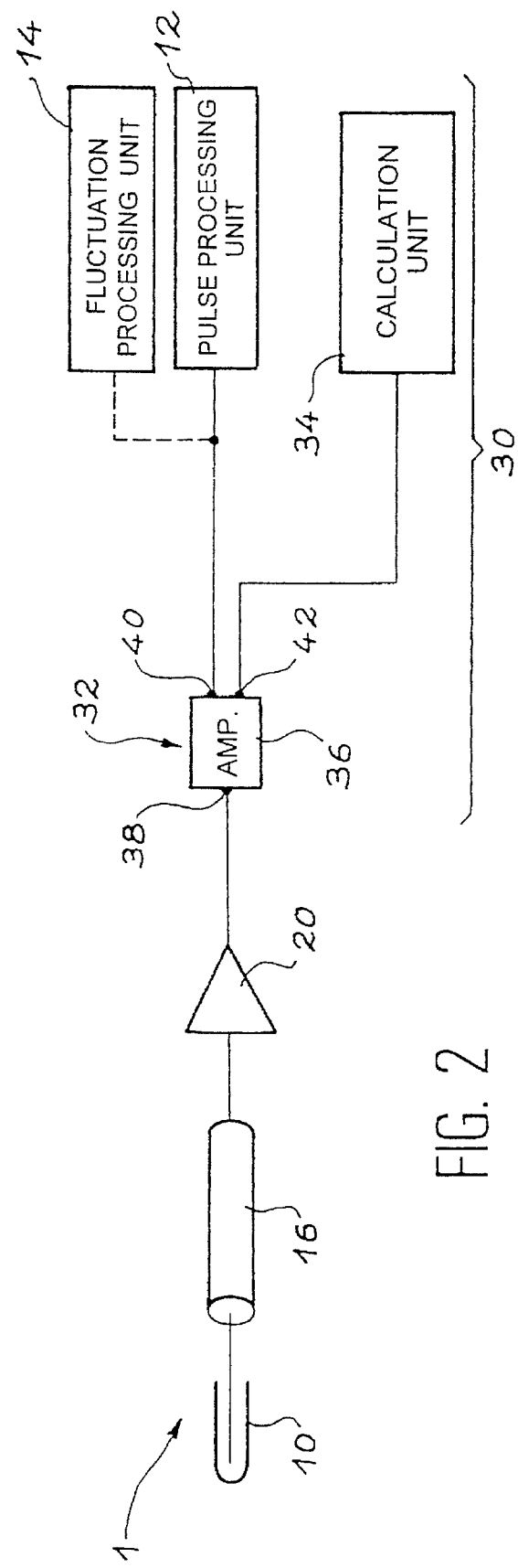

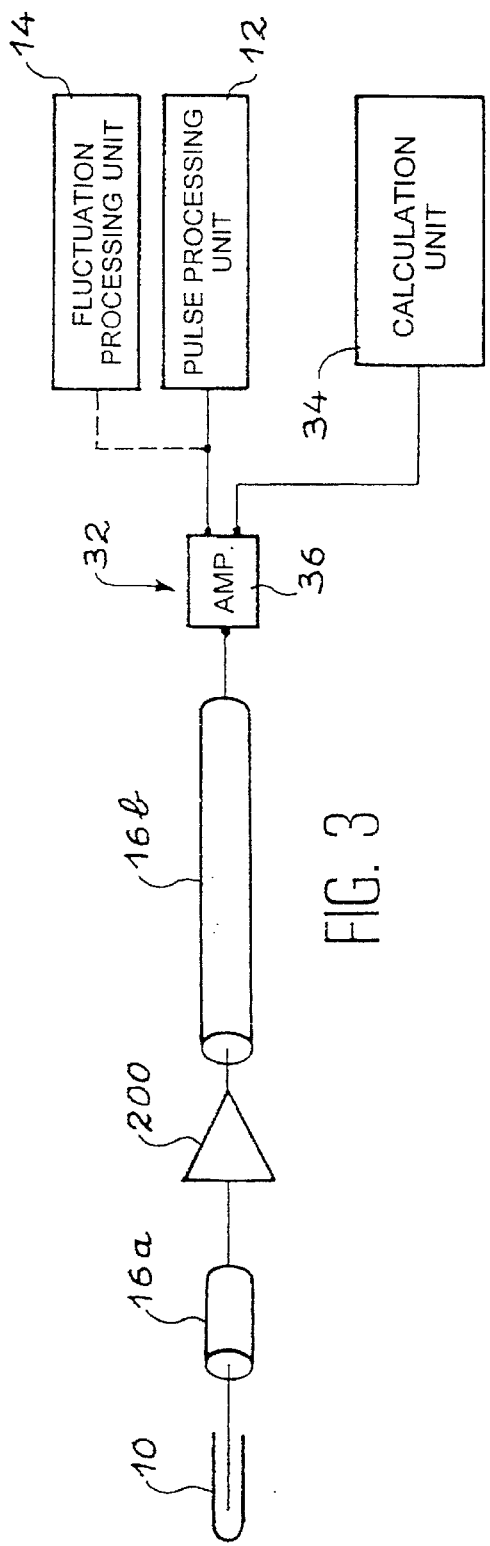
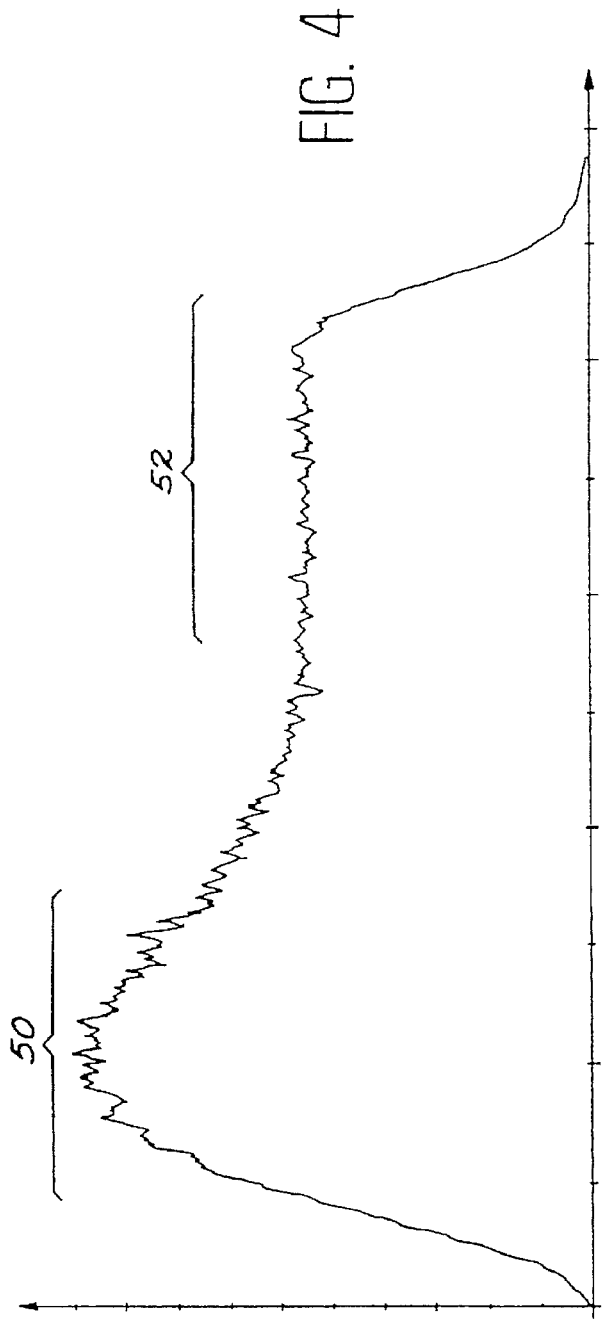
FIG. 3
FIG. 4

SYSTEM AND METHOD FOR VALIDATING THE DETECTION SIGNAL OF A MEASURING CHAIN WITH A WIDE BAND OF NUCLEAR RADIATIONS

FIELD OF THE INVENTION

The present invention concerns a system and method for validating the detection signal of a wide band measuring chain with nuclear radiations. The validation of the detection signal is understood as the delivering of information ensuring with a certain degree of confidence that the measurement made is correct and that the instrumental chain is in a state of normal functioning.

"Wide band" measuring chains are measuring chains whose pass-band is sufficiently wide so as to avoid significantly distorting the measuring signals delivered. Normally, these chains have a pass-band of several megahertz.

Thus, the validation system of the invention concerns in particular chains of the type for counting fluctuations and chains for counting pulses.

The invention can also be used in measuring chains for nuclear power stations, spectrometric chains of plants for processing radioactive products, but also in radioprotection applications or applications concerning the instrumentation for measuring radiations in nuclear medicine.

BACKGROUND OF THE INVENTION

FIG. 1 is a diagrammatic view of a known type of measuring chain. The measuring chain 1 comprises a detector 10 connected to a pulse processing unit 12 and/or a fluctuation processing unit 14 by means of an impedance-adapted cable 16 and an amplifier 20 able to transform the current pulses of the signal furnished by the detector 10 into voltage pulses. The detector 10 may be a proportional counter able to measure neutron fluxes. When the neutron flux is low, the signal of the detector shall preferably be processed by a pulse processing unit. On the other hand, when the flux is higher, the signal may be processed by a fluctuation processing unit, this unit being sensitive to the quadratic variations of the signal.

Control of the proper functioning of the measuring chains and the validation of the signals delivered are currently carried out by using various techniques.

As regards the instrumental portion of the measuring chain, this involves control of the serviceable voltages of the devices comprising the chain, such as the amplifier, control of the correct connecting of the cables which connect these devices together, or even the verification of the minimum and maximum counting thresholds of the chain.

As regards the electronic devices for processing detection signals, test pulse generators are used.

In certain cases, horizontal projections are made of curves characteristic of the detectors of counting chains. By way of example, for the source level measuring chains of nuclear power stations, that is for measuring chains carrying nuclear radiation low flux counting, discrimination curves are plotted. On the basis of these curves, the slope of a detection degree or the detector(s) is read. If this slope expressed as a percentage is outside an authorised variation field, the detector needs to be changed.

This method has a relatively empirical character and does not make it possible to diagnose the verified defect or malfunctioning or anticipate its appearance.

Irrespective of the method currently used for validating the signal of the measuring chain, generally speaking, it appears that this validation requires the inhibition or transitory stoppage of the measurements.

Furthermore, the controls carried out render it difficult to take account of the ageing of the components or anticipate their replacement.

One object of the present invention is accordingly to offer a system and method for validating the signals of a radiation measuring chain not exhibiting the limitations and drawbacks mentioned above.

Another aim is also to offer a validation system which does not require the stoppage of radiation measurements or the halting of installations equipped with the measuring chain.

Another aim is to offer a system able to detect any possible deterioration of the sensor or detector of the measuring chain, even before the consequences of this deterioration concerning the validity of the signal become too significant.

Finally, another aim is to offer a system able in certain cases to determine the cause or localisation of the detected malfunctioning.

SUMMARY OF THE INVENTION

So as to attain these aims, the invention concerns a system for validating the signal of a chain for measuring nuclear radiations and including a radiation detector able to deliver a wide spectral band detection signal to at least one signal processing unit, wherein the validation system comprises means for copying the detection signal and a calculation unit, the copying means being able to deliver a copy of the detection signal to the calculation unit, the latter being able to calculate spectral measuring information representative of the spectrum of the detection signal and compare the spectral measuring information with reference spectral information.

The comparison of the spectral information with the reference information stored in a memory, for example, makes it possible to determine the good or improper functioning of the measuring chain. This comparison takes place at the same time as the processing of the signal, that is without interrupting the measurements.

Contrary to known types of validation methods, which are limited to monitoring certain parameters of the measurement or the counting percentage as described above, the system and method of the invention make full use of the signal for validation. In fact, validation is based on the entire information the signal carries, that is concerning its entire frequential spectrum.

The comparison between the spectral measuring information and the reference spectral information may, according to one particular aspect of the invention, be carried out by calculating a spectral distance. The spectral distance may be included as a difference between the measuring and reference information and is calculated according to an appropriate algorithm.

There are several possibilities for calculating a spectral distance. For more details concerning these calculations, reference may be made to the information contained in document (1) entitled "Distance measures for signal processing and pattern recognition" by Mich+e.fra e+ee le Basseville, Signal Processing, V. 18, N° 4, Dec. '89, pp. 349 to 369.

According to a particular characteristic of the invention, the calculation unit may comprise a digital computer with a power spectral density forming the spectral measurement information.

Thus, the power spectral density, expressed as a function of the frequency, is compared with a reference power spectral density, for example by comparing the spectral distance mentioned above.

The power spectral density (PSD) of a signal may also be calculated in different ways, for example by taking the square of the module of the Fourier transform of the measured signal.

The PSD may also be restored according to an ARMA type model.

This consists of modelling the signal by a parametric model which depends on a finite number of parameters.

A comparison may then be made between the spectral information of the modelized function and reference spectral information.

For more details concerning the parametric models and in particular the ARMA type model, reference can be made to document (2) entitled "Spectrum Analysis: A modern perspective" by S. M. Kay and S. L Marple, Journal Proceedings of the IEEE, vol. 69, N° 11, Nov. 1981, pp. 1380–1414.

According to a particular embodiment of the system of the invention, the signal copying means may comprise an amplifier inserted in the measuring chain upstream of the signal processing unit. The amplifier may comprise an input connected to the detector, a first output connected to the processing unit and a second output connected to the calculation unit. The first and second outputs of the amplifier each deliver a signal identical to the signal applied to the input of the amplifier.

Other characteristics and advantages of the present invention shall appear more readily from the following description, given solely by way of non-restrictive illustration, with reference to the accompanying drawings.

BRIEF DESCRIPTION OF THE DRAWINGS

FIG. 1, already described, is a diagrammatic view of a known type of fluctuation/pulse measuring chain, FIG. 2 is a diagrammatic view of a first measuring chain example equipped with a validation system conforming to the present invention, FIG. 3 is a diagrammatic view of a second measuring chain example equipped with the validation system conforming to the present invention, FIG. 4 is a graphical representation of an example of a power spectral density of a signal used for its validation.

DETAILED DESCRIPTION OF THE PREFERRED EMBODIMENTS

For all the figures described, identical or similar elements respectively bear the same references.

Thus, FIG. 2 shows a detector 10 connected to a known type of pulse processing unit 12 and/or a fluctuation processing unit 14 by means of a cable 16 and an amplifier 20 for shaping the signal.

The measuring chain 1 is equipped with a validation system 30 conforming to the invention.

This system 30 comprises means 32 for copying the measuring signal so as to direct a copy of the signal to the calculation unit 34.

The means 32 comprise an amplifier 36 with an input 38 impedance-adapted to the output of the amplifier 20. The amplifier 36 comprises a common collector double output. A first output 40 is connected to the units 12 and/or 14, whereas a second output 42 is connected to the calculation unit 34. The outputs 40, 42 have impedances adapted with respect to the units 12, 14 and 34, the input impedance and the output impedances typically being 50 Ω. The outputs 40 and 42 deliver a signal, identical to the signal received on the input 38, to the processing units 12 and/or 14, and to the calculation unit 34 of the validation system.

Thus, the validation system is "transparent" with respect to the measuring chain, that is the processing units 12, 14 receive exactly the same signal as the one which would be furnished to it in a configuration, such as the one described in FIG. 1.

The pulse and fluctuation processing units 12 and 14 may respectively comprise amplitude discrimination means (measure in pulses) or a pass-band selector (measure in fluctuations). However, these devices are disposed on the measuring chain behind the signal copying means, that is following the taking of information for the validation system.

A measuring chain equipped with the validation system in accordance with FIG. 2 is particularly adapted to the measuring conditions in which it is necessary to keep the electronic devices away from the processing units and the validation system. This is the case with the measuring chains on pressurised water reactors in which cable links 16 are provided possibly reaching lengths of between 100 and 200 meters.

A further example of a measuring chain equipped with the validation system conforming to the invention is shown on FIG. 3.

This figure shows elements identical or similar to those of FIGS. 1 and 2 and bear the same references and reference may be made to the preceding description.

However, note the presence of two cable portions 16a and 16b, the portion 16b being impedance-adapted effecting the link between the detector 10 and the signal copying means 32. The portions 16a and 16b respectively connect the detector 10 to the input of the amplifier 200 and the amplifier output 200 to the input of the signal copying means 32.

The amplifier 200 is a charge amplifier. It is distinguished from the current amplifier 20 of FIG. 2 in that it directly integrates the charges delivered by the detector 10 so as to provide the processing units with a signal shaped by voltage pulses.

A measuring chain conforming to FIG. 3 has the advantage of providing a signal with a better signal-to-noise ratio than a chain conforming to FIG. 2. However, the useable cable length between the detector and the amplifier is much smaller, namely about between 10 and 30 m. The amplifier 200 of FIG. 3 thus needs to be disposed closer to the detector than the amplifier 20 of FIG. 2. This explains the presence of the two cable portions 16a and 16b of FIG. 3.

It seems that the validation system of the invention can be used, irrespective of the configuration of the measuring chain.

FIG. 4 makes it possible to more readily understand the possibilities offered by the invention so as to determine the validity of a signal received, but also for diagnosing a possible malfunctioning or fatigue of the measuring chain.

The mechanism for creating the signal in the detector may be explained as follows. The particle to be detected provokes directly or indirectly in an inter-electrode space of the detector the appearance of pairs of charge bearers (positive electrons-ions or electrons-holes). When moving inside this space, under the action of the potential difference applied between the electrodes of the detector, these charged particles induce the electric measuring signal. The collection of the charges is fundamental as it originates from the effective signal. Now, so as to have a good description of the measured physical phenomenon, it is therefore essential to have available the entire band of frequencies of the signal.

In the case of source chains of EDF pressurised water reactors, the detectors used are proportional counters intended to measure neutron flows of normally between 0 and $10^5$ neutrons per second. The detector comprises a film of a fissile material which can interact with the incident neutrons so as to create two fission products, that is pairs of electrons-ions which ionise a gas between the electrodes of the detector and produce a signal according to the principle described above.

FIG. 4 represents a power spectral density curve of a signal detected according to the principle described above. The power density carried in ordinates and the frequency carried in abscissae are expressed in arbitrary scales. The power spectral density is an excellent indicator of the measuring validity of the signal. In fact, if the detector shows an operating anomaly adversely affecting the measurement, the charge collection process for collecting it is affected. Now, the collection of charges has direct consequences on the power spectral density. The line follow-up of the power spectral density, as explained earlier, makes it possible to detect changes in the physical phenomenon for collecting the charges.

The electrons of the pairs of ion electron carriers created in the detector have a speed of several orders of magnitude (between 2 and 3) greater than that of the ions. If the power spectral density (PSD) is considered of the total signal (electronics plus ionics), that is the frequential distribution of its energy, the fast electronic signal shall have high frequency components, whereas the slower ionic signal shall only have low frequency components.

On FIG. 4, the reference 50 corresponds to the low frequency components, that is the ionic signal, whereas the reference 52 corresponds to the high frequency components, that is to the electronic signal.

A particular example of a malfunction of the detector shows the influence of the change in the physical phenomenon for collection of charges on the power spectral density curve. The example concerns oxygen entering into the detector which is frequently the cause of malfunctions of detectors, especially in the reactors of electric power stations.

The oxygen molecule, highly electronegative, tends to be attached to electrons, that is to capture them, which leads the negative charge carrier, previously electron, to become a negative ion. As the negative ion has in an electric field a speed of migration much slower than the electron, this results in a reduction of the high frequency signal 52 (due to the electrons) and an increase of the low frequency ionic signal 50. As the attachment phenomenon is extremely effective as soon as a small amount of oxygen is present in a detector, the resultant modifications concerning the power spectral density become visible extremely quickly.

The comparison of the power spectral density curve with a reference curve thus makes it possible to validate or not validate the signal, but also, if appropriate, to have information concerning the cause of a malfunctioning or the state of the detector.

What is claimed is:

1. System for validating the signal of a nuclear radiation measuring chain and able to deliver a wide spectral band detection signal to at least one signal processing unit, wherein the validation system comprises means for copying the detection signal and a calculation unit, the copying means being able to deliver a copy of the detection signal to the calculation unit and the calculation unit being able to calculate spectral measuring information representative of the spectrum of the detection signal and compare the spectral measuring information with reference spectral information.

2. System according to claim 1, wherein the calculation unit comprises a digital computer able to calculate a spectral distance between the spectral measuring information and the reference spectral information.

3. System according to claim 2, wherein the detection signal copying means comprise an amplifier inserted in the measuring chain upstream of the signal processing unit, the amplifier comprising an input connected to the detector, one first output connected to the processing unit and a second output connected to the calculation unit, the first and second outputs of the amplifier each delivering a signal identical to the signal applied to the input of the amplifier.

4. System according to claim 1, wherein the calculation unit comprises a digital computer able to calculate a power spectral density of the detection signal, said power spectral density forming the spectral measuring information.

5. System according to claim 4, wherein the spectral information comprises parameters calculated according to an ARMA type parametric model of the measured radiation signal.

6. System according to claim 1, wherein the detection signal copying means comprise an amplifier inserted in the measuring chain upstream of the signal processing unit, the amplifier comprising an input connected to the detector, one first output connected to the processing unit and a second output connected to the calculation unit, the first and second outputs of the amplifier each delivering a signal identical to the signal applied to the input of the amplifier.

7. System according to claim 6, wherein the measuring chain further comprises an amplifier for shaping the detection signal disposed upstream of the copying means.

* * * * *